United States Patent [19]

Tragert

[11] 4,153,042
[45] May 8, 1979

[54] SOLAR COLLECTOR
[75] Inventor: William E. Tragert, Rockville, Md.
[73] Assignee: National Patent Development Corp., New York, N.Y.
[21] Appl. No.: 840,411
[22] Filed: Oct. 7, 1977
[51] Int. Cl.² .............................................. F24J 3/02
[52] U.S. Cl. ................................................. 126/271
[58] Field of Search ................ 126/270, 271; 237/1 A

[56] References Cited
U.S. PATENT DOCUMENTS

| 980,505 | 1/1911 | Emmet | 126/271 |
|---|---|---|---|
| 2,141,330 | 12/1938 | Abbot | 126/271 |
| 3,227,153 | 1/1966 | Godel et al. | 126/271 |

Primary Examiner—Kenneth W. Sprague

[57] ABSTRACT

A solar collector comprised of a frame and a plurality of tubular collector elements. Each collector element is comprised of an outer transparent tube, a metallic absorber tube, and an intermediate transparent tube which encloses the absorber tube. The absorber tube is coated with an absorptive coating and the outer tube is coated over a significant portion of its circumference with a reflective coating to reflect solar radiation onto the absorber tube. The intermediate tube serves to reduce convective and conductive heat losses, provides a structural support for the absorber tube, and chemically isolates the coated absorber tube from the reflective coating on the outer tube.

8 Claims, 4 Drawing Figures

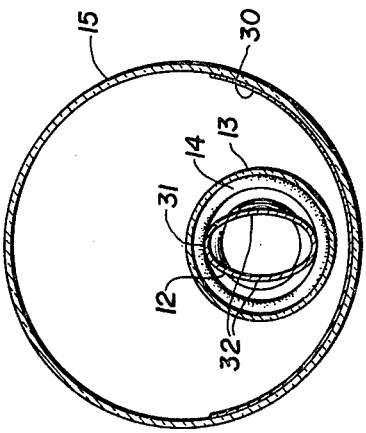
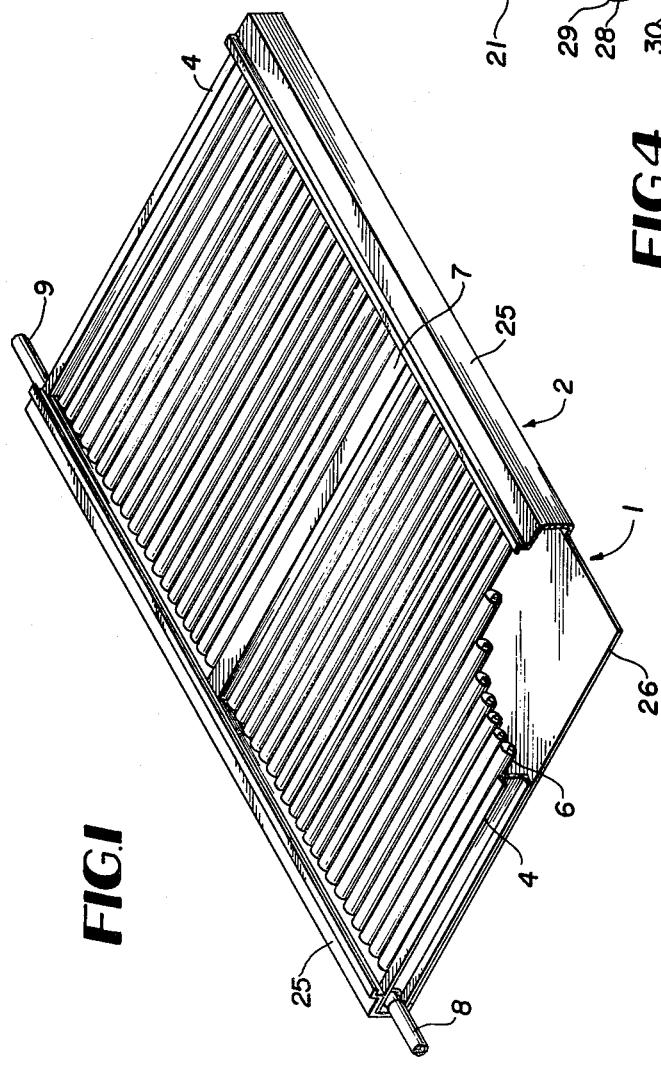
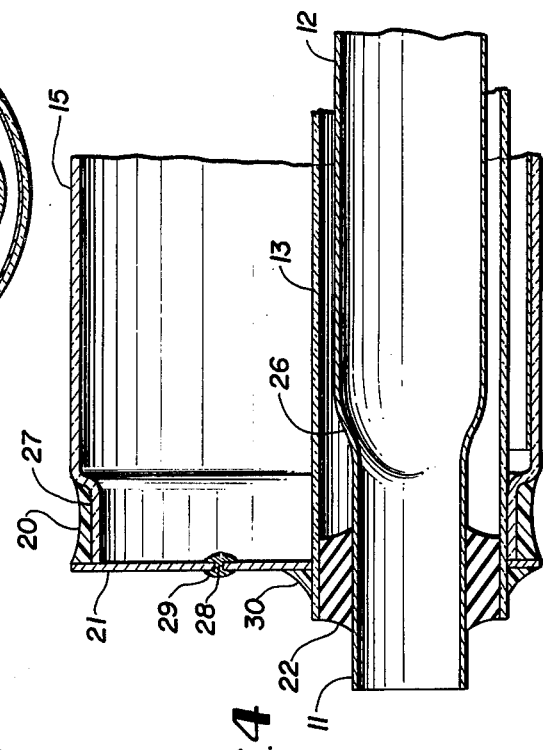
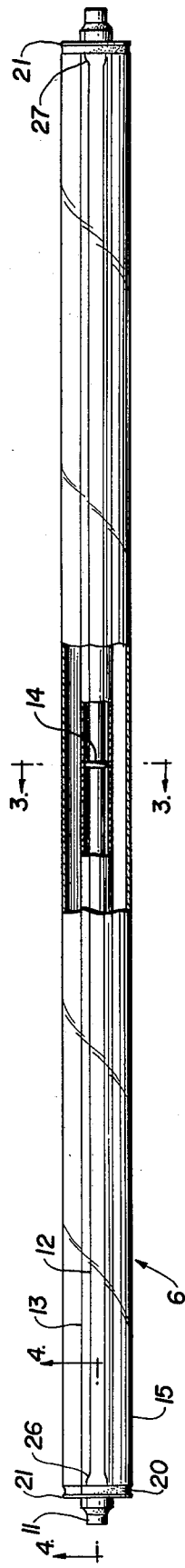

SOLAR COLLECTOR

The present invention is directed to an improved solar collector.

In recent years, there has been increased interest in heating and air conditioning systems which utilize solar energy. This has been due at least in part to the worldwide energy shortage, as the objective of the solar approach is to advantageously use the natural and abundant energy provided by the sun in place of more traditional fuels. In a typical solar heating system, a fluid which flows through the system is heated by the rays of the sun. Numerous prior art solar heating system have been proposed, and many are commercially available.

The solar collector is the part of the heating system which focusses the rays of the sun on fluid which flows in the collector. While it is important for the solar collector to be as efficient as possible, it is also frequently important that the manufacturing cost and selling price be kept relatively low if the utilization of solar energy is to compare economically with more traditional energy modes. As is known, the solar collectors of the prior art have not always provided an economical alternative.

Further, a significant source of inefficiency in some solar collectors of the prior art has been convective heat loss. Other problems which may have been encountered in varying degrees in prior art collectors are structural flimsiness, warping or buckling of the absorber, and chemical degradation of absorber or housing coatings or surfaces. Naturally, it is desirable to provide a structure which will overcome these difficulties.

It is therefore an object of the invention to provide a solar collector which is efficient in operation, yet which can be manufactured and sold at a relatively low cost.

It is a further object of the invention to provide a solar collector structure which results in high efficiency, which is sturdy, and which will provide many years of trouble-free service.

The above objects are accomplished by providing a novel structure for a solar collector which employs commercially available parts, thus resulting in economies of manufacture. More specifically, a plurality of individual coated absorber tubes, preferably of copper are provided, and each absorber tube is mounted in a separate commercially available outer transparent tube, preferably of glass, such as is used in fluorescent light sources. The transparent tubes are hermetically sealed and are coated with a reflective coating around a significant portion of their circumference so as to reflect the solar energy onto the absorber tube.

Additionally, the absorber tube is enclosed in an intermediate transparent tube also preferably of glass, of slightly larger diameter than the absorber tube. The intermediate tube is effective to prevent air which is heated by the absorber tube from migrating away fron the tube and this minimizes convective and conductive heat loss. Additionally, the intermediate tube provides structural advantages and chemically isolates the coated absorber tube from the reflective coating on the outer tube, thereby preventing chemical degradation of the coatings and/or absorber tube.

The invention will be better understood by referring to the drawings in which:

FIG. 1 is a perspective view of the solar collector of the invention.

FIG. 2 is a plan view of a single tubular collector element of the solar collector.

FIG. 3 is a section taken on line 3—3 of FIG. 2.

FIG. 4 is a section taken on line 4—4 of FIG. 2.

Referring to FIG. 1, it will be seen that solar collector 1 is comprised of a plurality of tubular collector elements 6 mounted in a collector frame 2. Collector frame 2 is constructed of a metal, preferably aluminum, and is comprised of side rails 25, end caps 4 and back cover 26. As will be described in greater detail below, each of the collector elements includes a metallic absorber tube mounted inside of an outer transparent tube and an intermediate transparent tube, the outer tubes being shown in FIG. 1. A manifold connects all of the absorber tubes, and the manifold inlet 8 and outlet 9 are also seen in FIG. 1.

In operation, the collector is mounted on a roof or other appropriate location at a desired angle to the sun, and water or other fluid is fed into manifold inlet 8. After being heated in the absorber tubes, the hot fluid exits from manifold outlet 9, and is fed to a utilization apparatus, typically a heating or air conditioning system.

The tubular collector elements 6 are shown in greater detail in FIGS. 2 to 4. Referring to FIG. 2, each collector element is comprised of an outer transparent tube 15, a metallic absorber tube 11 which carries the fluid to be heated, and an intermediate transparent tube 13 which encloses the absorber tube 11. The transparent tubes are preferably made of 008 soda-lime glass, and the absorber tube is preferably made of copper. Outer tube 15 is hermetically sealed at both ends by metallic end caps 21, which are secured to tube 15 by rigid seal 20, which is preferably formed by epoxy cement applied between cap 21 and lip 27 of tube 15. While the dimensions of the tubes may be varied to suit individual applications, in an embodiment which was built, each tubular element was 2 inches by 57 inches.

The objective of the solar collector is to focus as much solar energy as possible onto absorber tube 11 to heat the fluid flowing therein in an efficient manner. In this regard, the absorber tube is coated with a black coating having a high absorptivity and a low emissivity to absorb and retain infra-red energy which is incident on the tube. Further, outer tube 15 is coated with a reflective coating 30 around approximately half its circumference to reflect the solar rays onto the absorber tube 11. While a variety of specific absorptive coatings may be used, either black chrome or copper oxide is preferred, and a silvered finish is utilized for the reflective coating.

Returning to FIGS. 2 and 3, it should be noted that absorber tube 11 is compressed over the major portion 12 of its length into an approximately elliptical shape. The compressed portion 12 is interior of transition portions 26 and 27, and may be formed by any expedient known to those skilled in the art, such as by passing the round tube between two rollers which are spaced by a distance smaller than the diameter of the tube. The elliptical cross-section is provided to enable the tube to capture a greater percentage of the rays which are reflected from coating 30. Thus, referring to FIG. 3, when the collector is positioned in the sun, absorber tube 30 receives direct radiation at the top portion 31 and reflected radiation at compressed side portions 32.

It should be recognized that the tubular construction of the collector permits commercially available components to be utilized in its manufacture, thus resulting in economies of manufacture, and consequent lower possible selling price. Thus, the copper absorber tube and interior glass tube are commerically available commodities and for the outer glass containers, fluorescent light source tubes, also commercially available, may be advantageously used.

According to the principal aspect of the present invention, an intermediate transparent tube 13 is provided for enclosing absorber tube 11. As mentioned above, tube 13 is preferably made of glass, and is only slightly larger in diameter than than absorber tube.

Intermediate tube 13 is slightly longer than outer tube 15 and is suspended between holes in end caps 21. As shown in FIG. 4, tube 13 is secured to end caps 21 by rigid seal 30, preferably of epoxy cement. Copper tube 11 is slightly longer than intermediate tube 13 and is supported in tube 13 at the ends of resilient fluid-tight seals 22. At approximately the middle of the tubes, an O-ring spacer 14 separates tubes 11 and 13. Since the copper tube may change in length as much as 1/10" with changes in temperature, seals 22 must be resilient enough to permit significant changes in length without the occurrence of mechanical damage to the collector. At the same time, the seals must be fluid tight so that moisture which could degrade the coating on absorber tube 11 does not enter the tubular structure. While as known to those skilled in the art, a variety of specific materials for seal 22 may be used, silicon rubber is preferred.

Intermediate tube 13 serves several functions. Most importantly, it is effective to prevent the migration of heated air away from absorber tube 12, thus cutting down on convective and conductive heat losses and increasing the efficiency of the collector.

Secondly, tube 13 provides a structural support for absorber tube 12 which is not otherwise present, resulting in simplified manufacture and possible longer life of the unit. For instance, absorber tube 12 may be quite long, and without tube 13, might warp with changes in temperature. Since tube 13 closely surrounds the absorber tube, it limits through spacer ring 14 possible lateral deflection or bending of the tube and the possibility of warping. Further, to enhance the transfer of heat to the fluid, it may be desirable to use very thin copper for absorber tube 12. Such copper would tend to warp to a greater degree than thicker copper, and the presence of the intermediate tube and spacer thus permits the use of thinner copper for the absorber tube, again resulting in higher efficiency and lower costs for the collector.

Thirdly, the intermediate tube serves the function of chemically isolating the coated copper of the absorber tube from the reflective coating on the inside of outer tube 15. Without the presence of the intermediate tube, the reflective coating and coated copper could react with each other, thereby degrading either the reflective coating or the coated absorber tube.

Referring to FIG. 4, end cap 21 is seen to have a small hole 28 therein which is closed by a spot of solder 29. This hold is utilized during the manufacture of the tubular elements for de-pressurizing or drying operations, and is closed after the operations are completed.

The collector frame 2 shown in FIG. 1 is designed to minimize shading of the absorber network. In an actual embodiment built, the net collector area is 87% of the gross collector area and there is a 2% shading or reduction of net collector area at a 45° incident angle in any direction. The manifold insulation utilized is isocyanurate polyurethane foam, and because of the use of hermetically sealed tubular elements, no insulation is required to fill the space between the rear of the absorber network and the frame.

In an actual solar collector built according to the teachings of the invention, the efficiency has been found to be 50-60% under National Bureau of Standards test criteria (NBSIR 74-635). Additionally, because of the parallel arrangement of the reflectorized tubes, the array of elements can be factory rotated to a fixed angle which absorbs the optimum amount of solar radiation and the acceptance angle of the tubes is great enough so that seasonal adjustment of the collector tilt angle is not required.

While I have disclosed and described an embodiment of my invention, I wish it to be understood that I do not intend to be limited solely thereto, but intend to include all embodiments thereof in the art, and which come within the spirit and scope of my invention as defined by the following claims.

What is claimed is:

1. A solar collector including
   a housing,
   a plurality of tubular collector assemblies mounted within said housing, and
   means for flowing a liquid to be heated through said collector assemblies,
   each of said collector assemblies comprising,
   an elongated transparent cylindrical outer tube,
   an elongated transparent cylindrical inner tube having a diameter substantially smaller than the diameter of said outer tube,
   means mounting said inner tube within said outer tube in eccentric relation therewith,
   and an elongated metallic absorber tube mounted within and extending through said inner transparent tube,
   said outer tube having a reflective coating on its inner surface throughout substantially its full length and extending no more than about halfway therearound, the ratio of the diameter of the inner transparent tube to that of the absorber tube being much smaller than the ratio of the diameter of the outer transparent tube to the diameter of the inner transparent tube.

2. The solar collector of claim 1 wherein said absorber tube has an absorptive coating around its entire circumference.

3. The solar collector of claim 2 wherein said outer and inner transparent tubes are made of glass and said absorber tube is made of copper.

4. The solar collector of claim 3 wherein said copper tube is compressed so as to have an approximately elliptical cross section along at least the major portion of its length.

5. The solar collector of claim 4 further comprising spacer means positioned between said absorber and inner transparent tubes.

6. A solar collector including
   a housing,
   a plurality of tubular collector assemblies mounted within said housing, and
   means for flowing a liquid to be heated through said collector assemblies,
   each of said collector assemblies comprising,
   an elongated transparent cylindrical outer tube,
   an elongated transparent cylindrical inner tube having a diameter substantially smaller than the diameter of said outer tube, means mounting said inner tube within said outer tube in eccentric relation therewith, and an elongated metallic absorber tube mounted within and extending through said inner transparent tube, said outer tube having a reflective coating on its inner surface throughout substantially its full length and extending no more than about halfway around the circumference of the tube, said absorber tube being compressed so as to have an approximately elliptical cross-section along at least the major portion of its length, and being oriented so that the major axis of said elliptical cross-section if extended intersects said reflective coating at approximately the middle of the circumferential extent of said coating.

7. A solar collector including a housing, a plurality of tubular collector assemblies mounted within said housing, and means for flowing a liquid to be heated through said collector assemblies, each of said collector assemblies comprising, an elongated transparent cylindrical outer tube, an elongated transparent cylindrical inner tube having a diameter substantially smaller than the diameter of said outer tube, means mounting said innter tube within said outer tube in eccentric relation therewith, and an elongated metallic absorber tube mounted within and extending through said inner transparent tube, said outer tuber having a reflective coating on its inner surface throughout substantially its full length and extending no more than about halfway therearound, the ratio of the diameter of the inner transparent tube to that of the absorber tube being substantially less than the ratio of the diameter of the outer transparent tube to the diameter of the inner transparent tube, said outer transparent tube being closed at each end by a metallic end cap which is secured to said tube by a rigid seal, each said end cap having a hole therein, and said inner transparent tube having its opposed ends extending one through each of said holes and being secured to said end caps by a rigid seal, said absorber tube extending through said inner transparent tube and being secured to said inner transparent tube at respective ends thereof by a resilient seal, whereby said absorber tube can expand and contract with changes in temperature without causing mechanical damage to said collector.

8. The solar collector of claim 7 wherein said rigid seals are formed from an epoxy cement and said resilient seal is formed from a silicone rubber.

* * * * *